United States Patent [19]

Ebert et al.

[11] Patent Number: 4,655,414

[45] Date of Patent: Apr. 7, 1987

[54] PREVENTING INADVERTENT DOWNTHROTTLING OF THE OPERATIVE ENGINE IN A MULTI-ENGINE AIRCRAFT

[75] Inventors: Frederick Ebert, Westport; Stephen H. Silder, Monroe, both of Conn.; Michael A. Beims, Smithboro, N.Y.

[73] Assignee: United Technologies Corporation, Hartford, Conn.

[21] Appl. No.: 805,682

[22] Filed: Dec. 6, 1985

[51] Int. Cl.⁴ .................. B64D 31/04; B64D 31/06
[52] U.S. Cl. .................. 244/75 R; 60/39.15; 74/526
[58] Field of Search .................. 244/75 R, 76 R, 221, 244/224, 234, 182, 220; 340/52 R, 679; 74/565, 526, 483 R; 60/39.15, 39.091, 39.281

[56] References Cited

U.S. PATENT DOCUMENTS

| | | | |
|---|---|---|---|
| 2,407,877 | 9/1946 | Good | 74/483 |
| 2,793,541 | 5/1957 | Borcherdt | 74/565 |
| 3,599,510 | 8/1971 | Scott et al. | 244/234 |
| 4,109,547 | 8/1978 | Jacobson | 74/526 |
| 4,454,754 | 6/1984 | Zangranski et al. | 340/52 R |
| 4,567,786 | 2/1986 | Sakurai | 244/220 |

*Primary Examiner*—Galen Barefoot
*Attorney, Agent, or Firm*—Gerald E. Linden

[57] ABSTRACT

When an engine malfunctions in a multi-engine aircraft, movement of the throttle(s) associated with the other operative engine(s) is inhibited.

4 Claims, 2 Drawing Figures

PREVENTING INADVERTENT DOWNTHROTTLING OF THE OPERATIVE ENGINE IN A MULTI-ENGINE AIRCRAFT

BACKGROUND OF THE INVENTION

When an engine malfunctions, it should be downthrottled. Since the engine controls are all located in close proximity on a control console which is outside the field of view of a pilot concentrating on the primary controls, it is possible in an emergency situation to mistakenly shut down the operative engine in a multi-engine aircraft. This may result in unrecoverable flight conditions.

A need exists for a device which will warn the pilot in an engine out situation that another engine is still functioning properly, and prevent him from inadvertently disengaging that engine.

DISCLOSURE OF THE INVENTION

Therefore, it is an object of this invention to provide a technique for preventing the inadvertent downthrottling of the operative engine in a single engine malfunction situation.

According to the invention a signal from the engine control unit of a malfunctioning engine in a multi-engine aircraft is provided to a mechanism associated with the throttle lever(s) associated with the other operative engine(s) to deploy said mechanism(s), thereby inhibiting downthrottling of the operative engine(s). The mechanism may subsequently be overridden by the pilot to allow a full range of throttle movement.

Other objects, features, and advantages of the invention will become apparent in light of the following description thereof.

BEST MODE FOR CARRYING OUT THE INVENTION

Basically, the invention involves mechanically inhibiting downthrottling of an operative engine's shutoff lever in response to a malfunction in another engine, and is applicable to aircraft having two or more engines. Two engines (A and B) are discussed.

Figure 1:
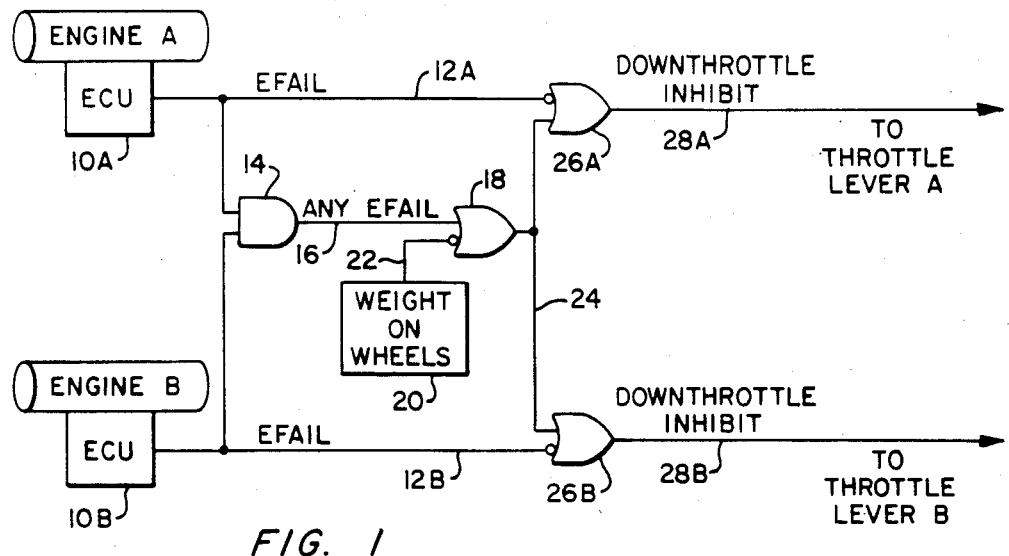
FIG. 1 is a schematic of the sensors, controls and logic required for implementing the present invention.

FIG. 1 shows the control logic for the invention. A typical electronic engine control unit 10A,10B is associated with each engine and monitors various parameters such as temperature, torque and turbine speed which are indicative of engine health. In the event of an engine malfunction (which will be assumed to have occurred when one or more of the parameters monitored by the engine control unit is beyond "safe" operating limits for some specified period of time), an engine failure signal (EFAIL) is provided by the engine control unit on a line 12A,12B. The engine failure signals from each engine control unit are "orred" in a common gate 14 to provide an any engine failed signal (ANY EFAIL) on a line 16 to an input of a common AND gate 18. Since an engine control unit may register failures during ground operations, a suitable sensor 20 provides a WEIGHT ON WHEELS signal on a line 22 to an inverted input of the AND gate 18, thereby inhibiting the output of the AND gate 18 when the aircraft is on the ground. When the aircraft is off the ground, the AND gate throughputs the ANY ENGINE FAILED signal on a line 24 to an AND gate 26A,26B associated with a particular engine. The ENGINE FAILURE signal for that engine is also provided to an inverted input of the AND gate 26A,26B for that engine so that when that particular engine is operative and the other engine is failed, the output of the AND gate provides a DOWNTHROTTLE INHIBIT signal on a line 28A,28B. The DOWNTHROTTLE INHIBIT signal can be used in a number of ways to prevent inadvertent downthrottling of the operative engine in an engine malfunction situation. One embodiment is described in detail.

Figure 2:
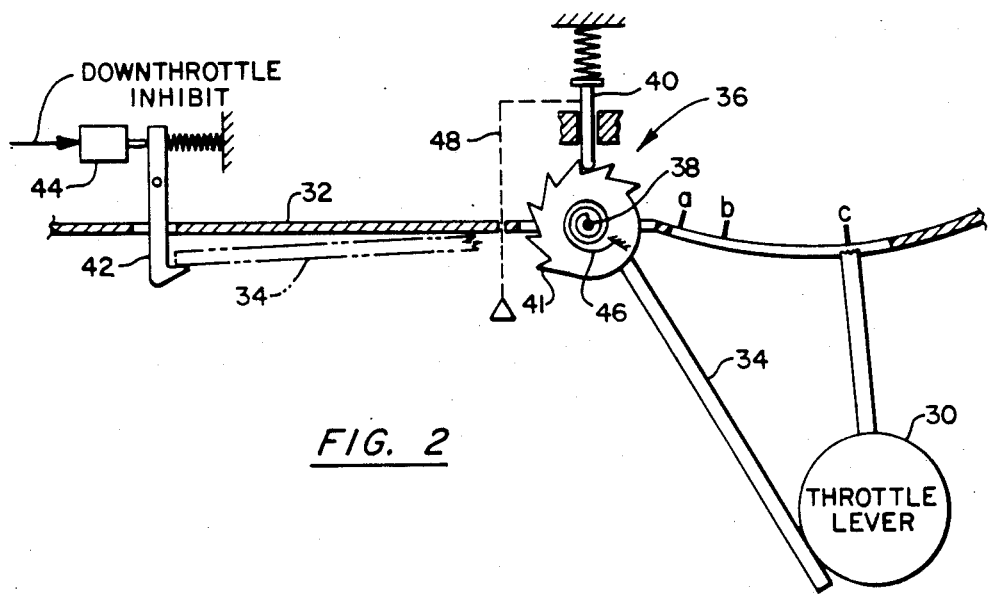
FIG. 2 is a drawing, partially in cross section and partially schematic, of the hardware required for implementing the present invention.

FIG. 2 shows an engine throttle lever 30 protruding from the ceiling 32 of the aircraft. Throttle positions "a", "b", and "c" are indicative of engine OFF, ground idle, and flight idle, respectively.

A plate 34, such as a shield or cover, is mounted by a toothed ratchet wheel 36 to the aircraft ceiling 32 at a pivot point 38 which is in the plane of throttle lever movement and offset from the throttle lever in a "downthrottle" direction therefrom. A spring loaded pawl 40 engages the teeth 41 of the ratchet wheel 36 to restrict motion of the plate 34 to a direction towards the throttle lever 30. As shown in phantom, the plate 34 is normally (all engines operative) pivoted away from the throttle lever 30 and is held flush with the aircraft ceiling by a spring-loaded pawl 42.

A solenoid 44 acts upon the pawl 42 to release the plate 34 from its normal ceiling-flush position in response to the DOWNTHROTTLE INHIBIT signal for the engine associated with that particular throttle lever, whereupon the plate 34 is urged down into position against the throttle lever 30 by a torsion spring 46 mounted at the pivot point 38. The throttle lever 30 may not then be pulled back against the plate 34 because of the ratchet teeth on the pivot wheel number. This condition exists when a single engine has failed.

In the event that the throttle lever 30 is set somewhere between positions b and c when the plate 34 is released, it is not desirable that the impact of the plate upon the throttle lever causes a throttle increase. Therefore, the spring rate for the torsion spring 46 is appropriately selected.

To reset the device, the pilot would have access to the spring loaded pawl 40 (for instance, via a linkage 48) to withdraw it from engagement with the teeth 41 of the ratchet wheel 36, and he could move the plate back to its normal position. The throttle lever could then be moved freely throughout its range. Additional logic could readily be added to prevent the solenoid 44 from activating the pawl 42 to release the plate 34 once the linkage 48 is operated to reset the device.

In no situation is it undesirable to have an operative engine lever blocked during a power out condition. Suppose, however, that there were a drive shaft failure in a downthrottle inhibited, operative engine. The release mechanism 48 for the ratchet wheel 36 would make it easy for the pilot to bring the engine off line if needed. This device will therefore not impede the pilot during an engine failure. Furthermore, the mechanical device of this invention is preferable to an electronic control which might artificially remove control of the throttle lever, since this device does not alter the primary function of any engine control. All engines out, is a condition beyond the intended scope of this invention.

The advantages of the invention are:
Provides aid to pilot in emergency situations
Requisite support electronics already installed on aircraft
Mechanical simplicity
Prevents accidental power shut down
Easily expanded to three or more engines
Does not impede increases in operative engine power (only decreases)
Easily reset in the event that accidental deployment occurs. Frangable teeth on the ratchet wheel and/or a frangible plate 34 are also a possibility to allow downthrottling if the release mechanism fails.

Alternate mechanisms acting directly on the throttle lever linkage are envisioned to provide a similar function as the mechanism of this invention.

We claim:

1. Apparatus for preventing inadvertent down-throttling of the operative engine(s) in an aircraft having at least two engines and a throttle lever associated with each engine, comprising:
   means for providing a signal indicative of the malfunctioning of a particular engine; and
   means for inhibiting movement of the throttle lever(s) associated with the other operative engine(s) in a downthrottle direction only in response to the signal.

2. Apparatus according to claim 1, wherein the means for inhibiting movement is a plate associated with each throttle lever and disposed in the plane of throttle lever movement and offset from the throttle lever in a downthrottle direction therefrom; and
   wherein the plate is electromechanically deployed into position against the throttle lever of the operative engine in response to the signal.

3. Apparatus according to claim 2 further comprising means for allowing the pilot to manually move the plate from its deployed position against the throttle lever, thereby allowing for movement of the throttle lever in the downthrottle direction.

4. A method for preventing inadvertent down-throttling of the operative engine(s) in case of a single engine malfunction in a multi-engine aircraft, comprising:
   sensing a single engine malfunction; and
   inhibiting movement of the throttle(s) associated with the other operative engine(s) in a downthrottle direction only in response to the sensed engine malfunction.

* * * * *